(12) United States Patent
Stell (10) Patent No.: US 9,164,968 B2
(45) Date of Patent: Oct. 20, 2015

(54) TECHNIQUES FOR SERVER-SIDE DETERMINATION OF FONT SUBSETS

(75) Inventor: Brian Stell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 411 days.

(21) Appl. No.: 13/558,652

(22) Filed: Jul. 26, 2012

(65) Prior Publication Data

US 2015/0161081 A1 Jun. 11, 2015

Related U.S. Application Data (60) Provisional application No. 61/511,859, filed on Jul. 26, 2011.

(51) Int. Cl.
*G06F 17/00* (2006.01)
*G06F 17/21* (2006.01)
*G06F 17/30* (2006.01)
*G06F 17/22* (2006.01)

(52) U.S. Cl.
CPC ............ *G06F 17/214* (2013.01); *G06F 17/227* (2013.01); *G06F 17/30011* (2013.01); *G06F 17/30876* (2013.01); *G06F 17/30905* (2013.01)

(58) Field of Classification Search
CPC ............ G06F 17/214; G06K 15/1802; G06K 15/1827; G06K 15/4015
USPC .................................. 715/234, 269, 200, 205
See application file for complete search history.

(56) References Cited

U.S. PATENT DOCUMENTS

| 5,528,742 A | | 6/1996 | Moore et al. |
| 6,023,714 A | | 2/2000 | Hill et al. |
| 6,065,008 A | * | 5/2000 | Simon et al. ......................... 1/1 |
| 6,313,920 B1 | * | 11/2001 | Dresevic et al. ............. 358/1.11 |
| 7,064,757 B1 | | 6/2006 | Opstad et al. |
| 7,155,672 B1 | * | 12/2006 | Adler et al. ..................... 715/210 |
| 8,090,769 B2 | * | 1/2012 | Suzumura et al. ............ 709/203 |
| 8,201,088 B2 | | 6/2012 | Levantovsky et al. |
| 8,615,709 B2 | * | 12/2013 | Lee ................. 715/269 |
| 2005/0193336 A1 | * | 9/2005 | Fux et al. ...................... 715/542 |
| 2005/0275656 A1 | * | 12/2005 | Corbin et al. ................. 345/467 |
| 2006/0170684 A1 | * | 8/2006 | Kobayashi et al. ........... 345/467 |
| 2009/0307585 A1 | * | 12/2009 | Tranchant et al. ............ 715/269 |
| 2010/0194753 A1 | * | 8/2010 | Robotham et al. ........... 345/428 |
| 2010/0199174 A1 | * | 8/2010 | Leonov et al. ................ 715/255 |
| 2010/0199197 A1 | | 8/2010 | Faletski et al. |
| 2010/0218086 A1 | * | 8/2010 | Howell et al. ................. 715/236 |
| 2011/0043528 A1 | * | 2/2011 | Solomonov et al. .......... 345/467 |
| 2011/0093565 A1 | | 4/2011 | Bacus et al. |
| 2011/0115797 A1 | * | 5/2011 | Kaplan ........................... 345/467 |
| 2011/0271180 A1 | * | 11/2011 | Lee ................. 715/269 |

(Continued)

*Primary Examiner* — Stephen Hong
*Assistant Examiner* — Gregory J Vaughn
(74) *Attorney, Agent, or Firm* — Remarck Law Group PLC (57) ABSTRACT

A computer-implemented technique is presented. The technique can include receiving, at a server comprising one or more processors, a first request from a computing device, the first request being for a source document associated with a web page, the source document specifying a font in which to display text in the source document. The technique can include obtaining, at the server, the source document indicated by the first request. The technique can include determining, at the server, a subset of the font by identifying unique characters in the source document, the subset of the font including less than all of the characters of the font. The technique can also include providing, from the server, the source document and information identifying the subset of the font to the computing device.

18 Claims, 4 Drawing Sheets

(56) References Cited

U.S. PATENT DOCUMENTS

| | | | |
|---|---|---|---|
| 2012/0066590 A1* | 3/2012 | Harris et al. | 715/269 |
| 2012/0079374 A1* | 3/2012 | Gaddis | 715/269 |
| 2013/0021361 A1* | 1/2013 | Liao | 345/589 |
| 2013/0120396 A1* | 5/2013 | Kaplan | 345/471 |
| 2013/0127872 A1* | 5/2013 | Kaplan | 345/467 |
| 2013/0326348 A1* | 12/2013 | Ip et al. | 715/269 |
| 2014/0019856 A1* | 1/2014 | Hernandez et al. | 715/269 |
| 2014/0240731 A1* | 8/2014 | Cogan | 358/1.9 |

\* cited by examiner

TECHNIQUES FOR SERVER-SIDE DETERMINATION OF FONT SUBSETS

CROSS-REFERENCE TO RELATED APPLICATIONS

This application claims the benefit of U.S. Provisional Application No. 61/511,859, filed on Jul. 26, 2011. The entire disclosure of the above application is incorporated herein by reference.

FIELD

The present disclosure relates to web fonts and, more particularly, to techniques for server-side determination of font subsets.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

As a user browses a network, e.g., the Internet, at a computing device (client-side), the computing device can transmit a request via the network to a server (server-side). In response to the request, the server can provide a source document indicative of a web page to the computing device. The source document can specify text, formatting, hyperlinks, and the like. Web browser software executing on the computing device can display the web page using the source document. The source document can also specify a font in which to display the text. When the computing device has the specified font, e.g., in memory, the computing device can quickly display the web page. When the computing device does not have the specified font, the computing device can either locate and download the font via the network, e.g., from the server or another server, or the computing device can use another font in a font stack specified by the source document.

SUMMARY

A computer-implemented technique is presented. The technique can include receiving, at a server comprising one or more processors, a first request from a computing device, the first request being for a source document associated with a web page, the source document specifying a font in which to display text in the source document. The technique can include obtaining, at the server, the source document indicated by the first request. The technique can include determining, at the server, a subset of the font by identifying unique characters in the source document, the subset of the font including less than all of the characters of the font. The technique can include providing, from the server, the source document and information specifying the subset of the font to the computing device. The technique can include receiving, at the server, a second request from the computing device when the computing device does not have the subset of the font specified by the information, the second request being for the subset of the font. The technique can also include one of (i) providing, from the server, the location to get the subset of the font to the computing device, e.g., when the location to get the subset of the font is known by the server, and (ii) generating, at the server, the subset of the font, and providing, from the server, the subset of the font to the computing device, e.g., when the location to get the subset of the font is not known by the server.

Another computer-implemented technique is also presented. The technique can include receiving, at a server including one or more processors, a first request from a computing device, the first request being for a source document associated with a web page, the source document specifying a font in which to display text in the source document. The technique can include obtaining, at the server, the source document indicated by the first request. The technique can include determining, at the server, a subset of the font by identifying unique characters in the source document, the subset of the font including less than all of the characters of the font. The technique can also include providing, from the server, the source document and information identifying the subset of the font to the computing device.

In some embodiments, determining the subset of the font can occur before, during, or after delivering the source document indicated by the request.

In other embodiments, the subset of the font includes the unique characters in the source document and one or more additional characters related to the unique characters in the source document.

In some embodiments, the subset of the font includes less than all of the unique characters in the source document.

In other embodiments, obtaining the source document can include retrieving, at the server, the source document in whole or in part from a datastore.

In some embodiments, obtaining the source document can include generating, at the server, the source document in whole or in part.

In other embodiments, the technique can further include receiving, at the server, a second request from the computing device, the second request being for the subset of the font.

In some embodiments, the technique can further include embedding, at the server, the subset of the font or a location of the subset of the font in the source document to obtain a modified source document, and providing, from the server, the modified source document to the computing device.

In other embodiments, the technique can further include providing, from the server, a location of the subset of the font to the computing device, and retrieving, at the computing device, the subset of the font from the location.

In some embodiments, the technique can further include generating, at the server, the subset of the font, and providing, from the server, the subset of the font to the computing device.

A server is also presented. The server can comprise a communication device and one or more processors. The communication device can be configured to receive a first request from a computing device, the first request being for a source document associated with a web page, the source document specifying a font in which to display text in the source document. The one or more processors can be configured to obtain the source document indicated by the first request, and determine a subset of the font by identifying unique characters in the source document, the subset of the font including less than all of the characters of the font. The communication device can be further configured to provide the source document and information identifying the subset of the font to the computing device.

In some embodiments, the one or more processors are configured to determine the subset of the font before, during, or after delivering the source document indicated by the request.

In other embodiments, the subset of the font includes the unique characters in the source document and one or more additional characters related to the unique characters in the source document.

In some embodiments, the subset of the font includes less than all of the unique characters in the source document.

In other embodiments, the one or more processors obtain the source document by retrieving the source document in whole or in part from a datastore, or by generating the source document in whole or in part.

In some embodiments, the communication device is further configured to receive a second request from the computing device, the second request being for the subset of the font.

In other embodiments, the one or more processors are further configured to embed the subset of the font or a location of the subset of the font in the source document to obtain a modified source document, and the communication device is further configured to provide the modified source document to the computing device.

In some embodiments, the communication device is further configured to provide a location of the subset of the font to the computing device, and the computing device is configured to retrieve the subset of the font from the location.

In other embodiments, the one or more processors are further configured to generate the subset of the font, and the communication device is further configured to provide the subset of the font to the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As previously described, when a computing device does not have a font specified by a source document for a web page, the computing device can locate and download the specified font via a network, e.g., the Internet, or the computing device can use another font in a font stack specified by the source document. Displaying the web page using an alternate font, however, may present the web page in a manner not envisioned by the web page's creator. In other words, the alternate font may display characters of the text in a different manner than the specified font. Locating and downloading a font can also be time consuming. Further, given the worldwide reach of the Internet, web pages may be presented in many different languages. Some languages, e.g., Japanese and Chinese, include thousands of different characters. The fonts for these languages can be very large and therefore downloading these fonts can be even more time consuming.

Accordingly, techniques are presented for server-side determination of font subsets. The techniques generally provide for faster loading of web pages at client-side computing devices. A font subset refers to only a portion of a font for displaying text. The font subset includes less than all of the characters of a specified font. A web page may not use every character of a specified font, and therefore only the subset of the specified font may be necessary to display text on the web page. In other words, the font subset may be a smaller set of characters of a specified font for faster loading of the web page. The server can determine the font subset for a web page by identifying unique characters in the source document. For example, the unique characters can include characters for text to be display in the web page, which can be specified by the source document.

The server can provide the requested source document and the font subset to the client-side computing device. The determination of the font subset can occur before delivering, during delivery of, or after delivering the source document from the server to the client-side computing device. When the computing device has the specified font subset, e.g., in memory, the computing device can display the web page. When the computing device does not have the specific font subset, the computing device can provide another request to the server. In response to this request, the server can provide either a location to get the font subset, e.g., a hyperlink, to the computing device or the server can generate the font subset and provide the font subset to the computing device. The server could also provide the font subset itself or its location by embedding data in the source document.

As previously mentioned, the font subset may generally include less than all of the characters of a specified font. The font subset, however, can also be over-inclusive. In other words, the font subset can include more than the characters required by the web page (the unique characters). The techniques can provide a font subset that includes the unique characters and additional characters. The additional characters can be those characters commonly used in the language of the web page, and/or characters related to or based on the unique characters. For example only, the font subset may include uppercase characters when only lowercase characters are required by the web page. Additionally or alternatively, for example, the techniques can provide a font subset including all accented characters in addition to required non-accented characters. Further, the techniques may not include one or more of the unique characters in the font subset. For example, the techniques may be unable to identify or locate a particular character of the specified font, and therefore the techniques may not include that particular character in the font subset.

Figure 1:
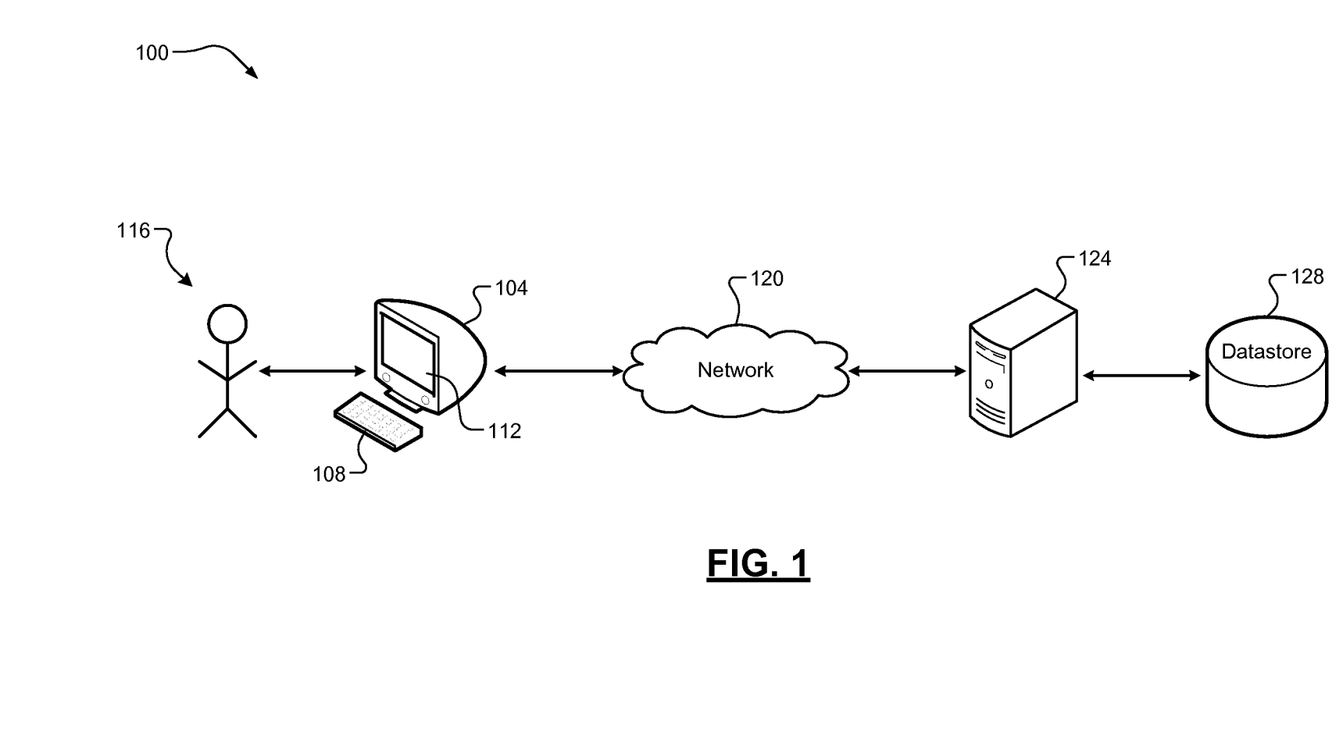
FIG. 1 is a schematic illustration of a system including an example server according to some implementations of the present disclosure.

Referring now to FIG. 1, an example system 100 is illustrated. The system 100 can include a computing device 104, such as a desktop computer, a laptop computer, a tablet computer, or a mobile phone. The computing device 104 can include a user interface 108 and a display 112. The computing device 104 can also include other components, e.g., one or more processors and memory. While the display 112 is shown and described as a separate component, the display 112 can also be part of the user interface 108. The user interface 108 can include one or more components for interaction between the computing device 104 and a user 116 (keyboard, mouse, etc.). The computing device 104 can also communicate with other components via a network 120. The network 120 can include a local area network (LAN), a wide area network (WAN), e.g., the Internet, or a combination thereof.

A server 124 can communicate with the computing device 104 via the network. The server 124 can include one or more processors and memory. It should be appreciated that while a single server is shown, two or more servers can be implemented, e.g., in a parallel server configuration. The server 124 can provide a source document to the computing device 104. As previously described, the source document can be interpreted by a web browser executing on the computing device 104 to display a web page to the user 116. The server 124 can store a plurality of source documents representing a plurality of web pages, respectively.

It should be appreciated that while a source document for a web page is discussed herein, the techniques of the present disclosure are applicable to any suitable document that can be transmitted via the network 120. Similarly, it should be appreciated that while a web browser for displaying a web page is discussed herein, the techniques of the present disclosure are applicable to any suitable software for processing the document(s) transmitted via the network 120.

The source documents can be stored at the server 124 and/or in a datastore 128. The datastore 128 can be located in the server 124 or external to the server 124, e.g., on the network 120. The datastore 128 can also store predetermined portions of source documents. These predetermined portions of source documents can also be referred to as templates. More specifically, the server 124 may generate a source document in order to display a web page having a predetermined layout according to one of the templates. In this manner, the server 124 can selectively retrieve one or more predetermined portions when generating a source document.

Figure 2:
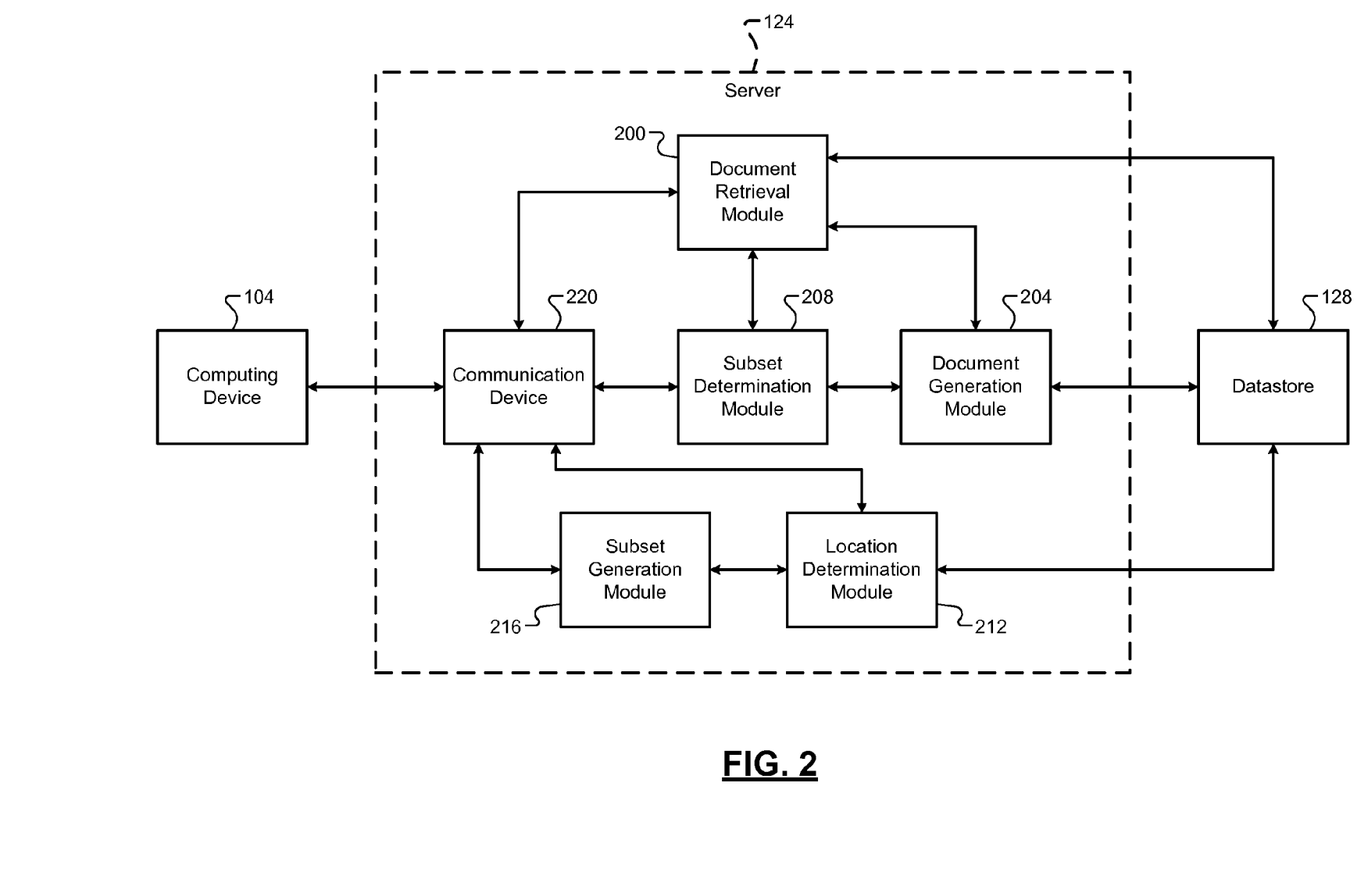
FIG. 2 is a functional block diagram of the example server of FIG. 1.

Referring now to FIG. 2, a functional block diagram of the example server 124 is illustrated. The server 124 can include a document retrieval module 200, a document generation module 204, a subset determination module 208, a location determination module 212, and a subset generation module 216. The server 124 can also include other components, such as a communication device 220 and memory (not shown). These modules can be executed entirely or partially by the one or more processors of the server 124. The communication device 220 can include one or more components suitable for enabling the server 124 to communicate via the network 120, e.g., with the computing device 104.

The document retrieval module 200 can receive a first request from the computing device 104 via the network 120. For example, the communication device 220 can receive the first request and can then send the first request to the document retrieval module 200. The first request can be for a web page. The first request, therefore, can also be for a source document associated with the web page. The computing device 104 can generate the first request in response to input from the user 116. For example only, the input from the user 116 can be either a universal resource locator (URL) address or selection of a hyperlink.

In response to receiving the first request, the document retrieval module 200 can attempt to retrieve the source document. The source document may have been previously stored in whole or in part in the server 124, e.g., cached in memory, or in the datastore 128. For example, the source document may have been previously generated in whole or in part, or retrieved in whole or in part from another server. The source document, however, may not have been previously stored at the server 124 or in the datastore 128. Additionally, some web pages may be dynamically generated for each user. For example, these web pages could include advertisements that are different each time the web pages are loaded.

When the source document is not present at the server 124, the document generation module 204 can generate the source document in whole or in part. As previously mentioned, the web page could be dynamically generated in whole or in part for each user. For example only, the web page may be an electronic mail (e-mail) account that is dynamically generated for each user to display their personal contacts in addition to advertisements based on their preferences or interests. The web page, therefore, may include one or more predetermined or predefined portions. These predetermined portions can be used as templates in generating the source document. The predetermined portions can be stored in the server 124 or in the datastore 128.

After retrieving or generating the source document in whole or in part, the subset determination module 208 can determine a font subset for the source document. The font subset can include less than all of the characters of the font. The subset determination module 208 can determine the font subset by identifying unique characters in the source document. For example, the unique characters can include characters for text to be display in the web page, which can be specified by the source document. As previously described, the subset of the font includes characters of the specified font which are required in order to display text of the web page. For example, the subset determination module 208 can record all unique characters that are streamed to the computing device 104 via the network 120.

Alternatively, for example, the source document can have embedded script or template language, e.g., processing tags such as active server pages (ASP), GXP, JavaServer Pages (JSP), and/or PHP tags, which can be used by the subset determination module 208 in determining the subset of the font. The subset determination module 208 can then provide the source document and information specifying the subset of the font to the computing device 104 via the network 120. For example only, the information specifying the subset of the font can be a unique identifier or code. The subset determination module 208 can send the source document and the information specifying the subset of the font to the communication device 220, which can transmit the source document and the information specifying the subset of the font to the computing device 104 via the network 120.

When the source document and the information specifying the subset of the font are received, the computing device 104 can attempt to display the web page using web browser software executing on the computing device 104. More specifically, the computing device 104 can determine whether the computing device 104 has the subset of the font specified by the information, e.g., in memory. When the computing device 104 does not have the subset of the font, the web page may not load as desired. For example, the web page could be loaded using another font in the font stack, the web page could be displayed with some unreadable characters, or the web page could be displayed in a manner not intended by its creator. In this case, the computing device 104 can generate a second request. The second request can be for the subset of the font. The second request may be generated in response to cascading style sheets (CSS) received, e.g., in the source document, from the server 124 via the network 120 (described in detail below).

In response to receiving the second request from the computing device 104 via the network 120, the location determination module 212 can determine a location to get the subset of the font, e.g., on the network 120. For example only, the location may be indicated by URL address or a hyperlink. For example, the communication device 220 can receive the second request and can then send the second request to the location determination module 212. The location determination module 212 may know one or more locations to get the subset of the font. For example, the one or more locations can be stored in the server 124 or in the datastore 128. In some implementations, the subset determination module 208 could include the location to get the subset of the font when initially providing the source document and the information specifying the subset of the font. The subset determination module 208 could embed the location in the source document as a hyperlink to the location, e.g., http://server/font1/subset1.

The location determination module 212 may not know the location to get the subset of the font. In this case, the location determination module 212 could search for the subset of the font via the network 120. This search could be performed using the communication device 220 to access the network 120. For example, the location determination module 212 could generate a search query for the subset of the font. As a result of the searching, the location determination module 212 may determine the location to get the subset of the font. After determining the location to get the subset of the font, the location determination module 212 can provide the location to the computing device 104 via the network 120. Alternatively, in the case that the location determination module 212 does not know the location to get the subset of the font, the location determination module 212 can provide CSS to the computing device 104 via the network 120 in order to enable the computing device 104 to request the subset of the font. For example, the CSS could be added to the source document.

In some cases, the location determination module 212 may not know the location to get the subset of the font and, if performed, the searching may fail to determine the location to get the subset of the font. The subset generation module 216 can generate the subset of the font. For example, the subset generation module 216 can generate the subset of the font by compiling each of the unique characters in the source document into a common file. For example only, each of the unique characters in the specified font can be a separate image file. The subset of the font can be expressed as a list. For example only, the subset of the font could be "abcd" for a Latin or Roman alphabet-based, e.g., English, font.

After generating the subset of the font, the subset generation module 216 can then provide the subset of the font to the computing device 104 via the network 120. The subset generation module 216 can download or stream the subset of the font to the computing device 104. For example only, the subset generation module 216 can provide the subset of the font by providing the list as a URL parameter (e.g., http://server/font?text=abcd) by encoding the list as a file name (e.g., http://server/font-name/abcd) by sending the list as a separate file, or by sending the list as a mime type in CSS provided to the computing device 104 (described above). It should be appreciated that other techniques can be used. For example only, the subset generation module 216 could also embed the subset of the font itself directly into the source document. For example, the subset generation module 216 can send the subset of the font to the communication device 220, which can transmit the subset of the font to the computing device 104 via the network 120.

When the computing device 104 receives the location to get the subset of the font from the server 124, the computing device 104 can retrieve, e.g., download, the subset of the font from the location. The computing device 104 can then display the web page in the web browser executing on the computing device 104 using the subset of the font. Alternatively, when the computing device 104 receives the subset of the font itself from the server 124, the computing device 104 can then display the web page in the web browser executing on the computing device 104 using the subset of the font. The computing device 104 can also store the subset of the font, e.g., in memory, in order to expedite displaying of web pages using the same subset of the font in the future.

Figure 3:
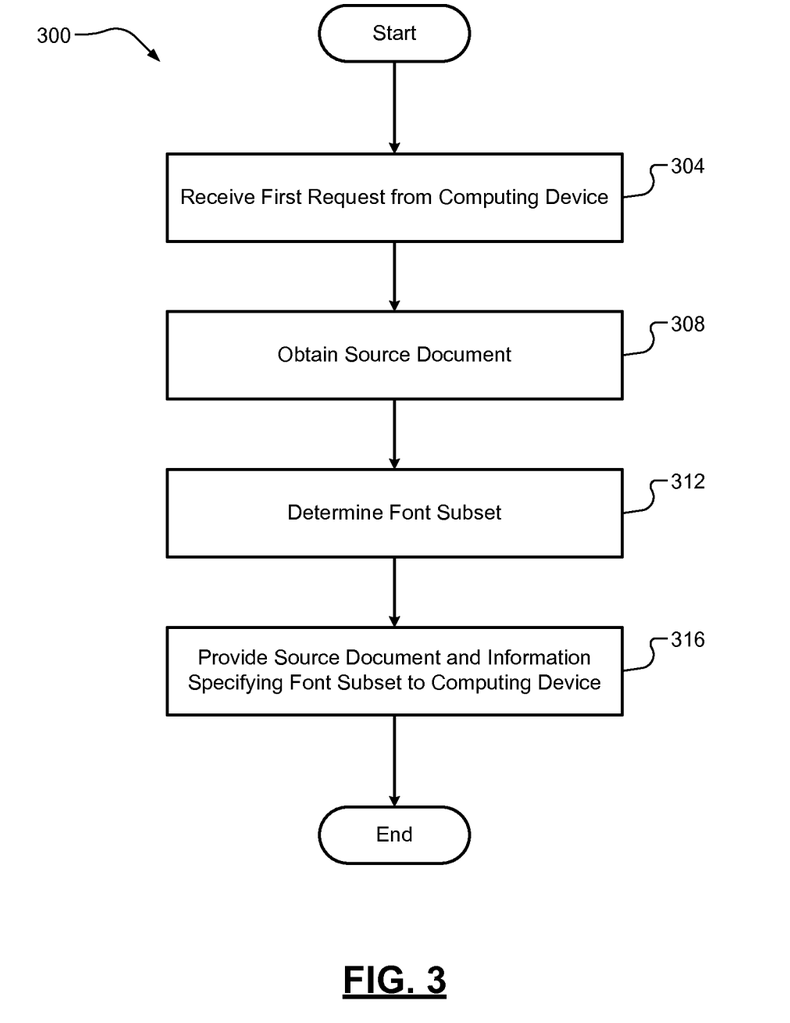
FIG. 3 is a flow diagram of an example technique for server-side determination of font subsets according to some implementations of the present disclosure.

Referring now to FIG. 3, an example technique 300 for server-side determination of font subsets is illustrated. At 304, the server 124 can receive the first request from the computing device 104 via the network 120. The first request can be for the source document associated with the requested web page. The source document can also specify the font for displaying text of the web page. At 308, the server 124 can obtain the source document indicated by the first request. The server 124 can obtain the source document by retrieving the source document in whole or in part from memory or from the datastore 128 or by generating the source document in whole or in part. At 312, the server 124 can determine the subset of the font by identifying unique characters in the source document. At 316, the server 124 can provide the source document and information identifying the subset of the font to the computing device 104 via the network 120. The technique 300 can then end or return to 304 for one or more additional cycles.

Figure 4:
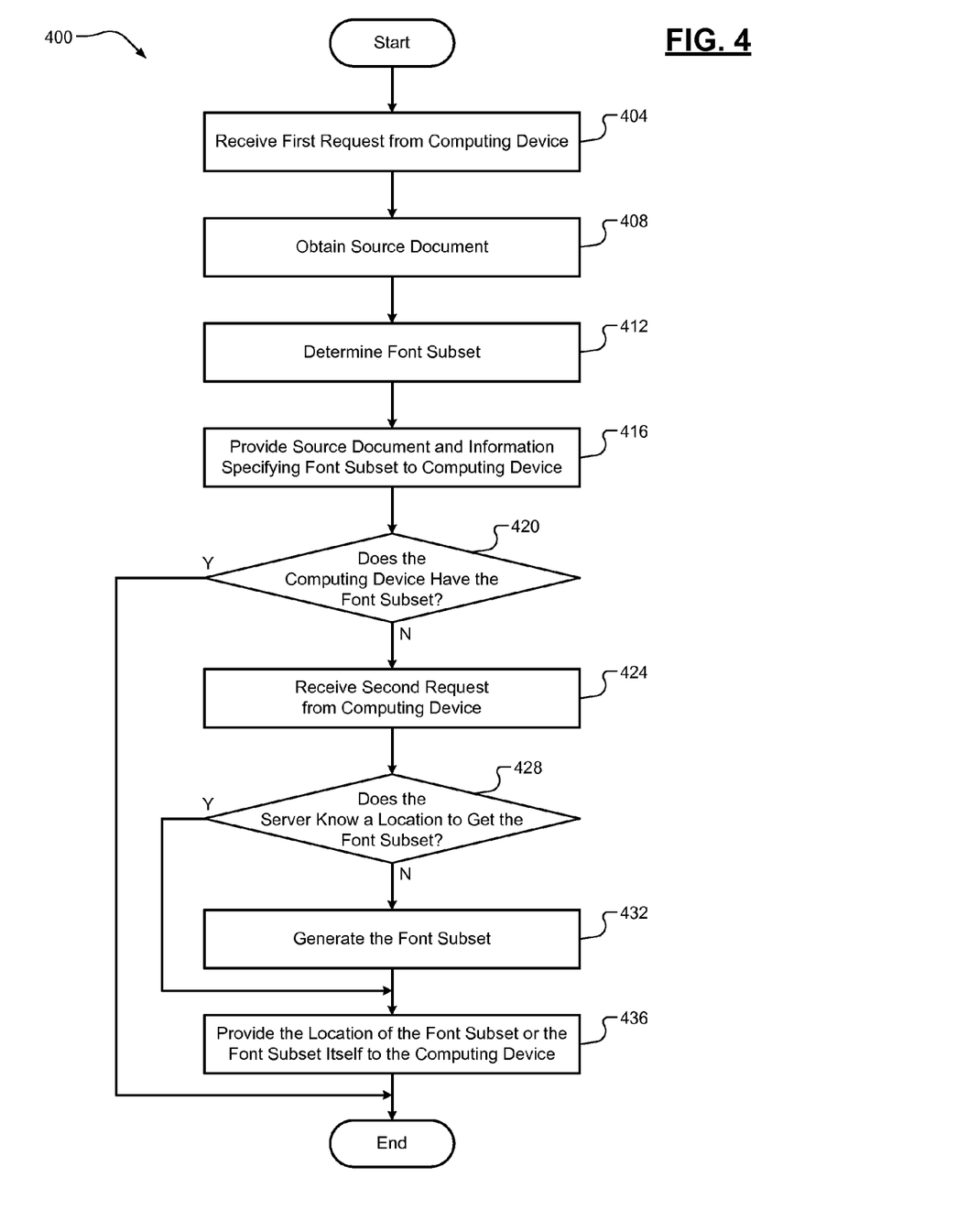
FIG. 4 is a flow diagram of another example technique for server-side determination of font subsets according to some implementations of the present disclosure.

Referring now to FIG. 4, an example technique 400 for server-side determination of font subsets is illustrated. At 404, the server 124 can receive the first request from the computing device 104 via the network 120. The first request can be for the source document associated with the requested web page. The source document can also specify the font for displaying text of the web page. At 408, the server 124 can obtain the source document indicated by the first request. At 412, the server 124 can determine the subset of the font by identifying unique characters in the source document.

At 416, the server 124 can provide the source document and information specifying the subset of the font to the computing device 104 via the network 120. At 420, the server 124 can receive the second request from the computing device 104 when the computing device 104 does not have the subset of the font specified by the information. The second request can be for the subset of the font. At 424, the technique 400 determines whether the location to get the subset of the font is known by the server 124. The location of the subset of the font can either be already known by the server 124, e.g., in memory or in the datastore, or the location of the subset of the font can be determined by searching the network 120. When the server 124 knows the location to get the font subset, the technique 400 can proceed to 428. When the server 124 does not know the location to get the font subset, the technique 400 can proceed to 432. At 428, the server 124 can provide the location to get the subset of the font to the computing device 104 via the network 120. The technique 400 can then end or return to 404 for one or more additional cycles. At 432, the server 124 can generate the subset of the font and provide the subset of the font to the computing device 104 via the network 120. The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an,"

and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a server including one or more processors, a first request from a computing device, the first request being for a source document associated with a web page, the source document specifying a font in which to display text in the source document;
obtaining, at the server, the source document indicated by the first request;
determining, at the server, a subset of the font by identifying unique characters in the source document, the subset of the font including less than all of the characters of the font;
providing, from the server, the source document and information specifying the subset of the font to the computing device;
receiving, at the server, a second request from the computing device when the computing device does not have the subset of the font specified by the information, the second request indicating a request for the subset of the font;
embedding, at the server, the subset of the font in the source document to obtain a modified source document; and
providing, from the server, the modified source document to the computing device.

2. A computer-implemented method comprising:
receiving, at a server including one or more processors, a first request from a computing device, the first request being for a source document associated with a web page, the source document specifying a font in which to display text in the source document;
obtaining, at the server, the source document indicated by the first request;
determining, at the server, a subset of the font by identifying unique characters in the source document, the subset of the font including less than all of the characters of the font, wherein the subset of the font includes the unique characters in the source document and one or more additional characters related to the unique characters in the source document; and
providing, from the server, the source document and information identifying the subset of the font to the computing device.

3. The computer-implemented method of claim 2, wherein determining the subset of the font occurs before, during, or after delivering the source document indicated by the request.

4. The computer-implemented method of claim 2, wherein obtaining the source document includes retrieving, at the server, the source document in whole or in part from a datastore.

5. The computer-implemented method of claim 2, wherein obtaining the source document includes generating, at the server, the source document in whole or in part.

6. The computer-implemented method of claim 2, further comprising receiving, at the server, a second request from the computing device, the second request being for the subset of the font.

7. The computer-implemented method of claim 6, further comprising:
embedding, at the server, the subset of the font in the source document to obtain a modified source document; and
providing, from the server, the modified source document to the computing device.

8. The computer-implemented method of claim 2, wherein the one or more additional characters related to the unique characters include one or more characters having a different case than one or more of the unique characters.

9. The computer-implemented method of claim 2, wherein the one or more additional characters related to the unique characters include one or more characters having a different accent than one or more of the unique characters.

10. The computer-implemented method of claim 2, wherein the server is a web server configured to provide the source document for the web page directly to the computing device in response to the first request.

11. A server, comprising:
a communication device configured to receive a first request from a computing device, the first request being for a source document associated with a web page, the source document specifying a font in which to display text in the source document; and
one or more processors configured to
obtain the source document indicated by the first request, and
determine a subset of the font by identifying unique characters in the source document, the subset of the font including less than all of the characters of the font, wherein the subset of the font includes the unique characters in the source document and one or more additional characters related to the unique characters in the source document, and
wherein the communication device is further configured to provide the source document and information identifying the subset of the font to the computing device.

12. The server claim 11, wherein the one or more processors are configured to determine the subset of the font before, during, or after delivering the source document indicated by the request.

13. The server of claim 11, wherein the one or more processors obtain the source document by retrieving the source document in whole or in part from a datastore, or by generating the source document in whole or in part.

14. The server of claim 11, wherein the communication device is further configured to receive a second request from the computing device, the second request being for the subset of the font.

15. The server of claim 14, wherein the one or more processors are further configured to embed the subset of the font in the source document to obtain a modified source document, and wherein the communication device is further configured to provide the modified source document to the computing device.

16. The server of claim 11, wherein the one or more additional characters related to the unique characters include one or more characters having a different case than one or more of the unique characters.

17. The server of claim 11, wherein the one or more additional characters related to the unique characters include one or more characters having a different accent than one or more of the unique characters.

18. The server of claim 11, wherein the server is a web server configured to provide the source document for the web page directly to the computing device in response to the first request.

* * * * *